United States Patent Office

3,443,900
Patented May 13, 1969

3,443,900
DENSIFICATION OF ACETYLENE BLACK
Michael Bregazzi, Dorval, Quebec, Canada, assignor to Shawinigan Chemicals Limited, Montreal, Quebec, Canada, a corporation of Canada
No Drawing. Filed Sept. 28, 1966, Ser. No. 582,518
Int. Cl. C09c 1/48
U.S. Cl. 23—209.1          3 Claims

ABSTRACT OF THE DISCLOSURE

A method for increasing the stable apparent density of acetylene black to values greater than 20 lbs. per cu. ft. involving ball milling, pulverization, and tumbling as the critical sequence of processing stages.

---

This invention relates to the densification of acetylene black and more particularly to a densification process in which the acetylene black is modified to impart a stable increased density thereto.

It is well known that acetylene black has a chain-like structure which gives the material considerable resiliency and resistance to densification. Attempts to increase its density by compression between rollers, by ball milling, by wet mulling, and other procedures have not produced products of satisfactory stable density. Because of its resiliency, the acetylene black densified by the foregoing methods expands or fluffs up on stirring or mixing and does not settle back and return to the density which is temporarily imparted to it by such prior procedures.

It has now been found that a combination of ball milling and pulverizing steps apparently alters the structure of acetylene black sufficiently to permit a permanent degree of increased density to be imparted to the material by a third step which is not a conventional densification procedure. The invention thus consists in a process for the densifiaction of acetylene black to an apparent density greater than 20 lbs. per cubic ft. which comprises (1) ball milling the acetylene black to achieve a desirable degree of increased density, more particularly until its apparent density has increased at least 50%, (2) pulverizing the flakes of material which are formed by the ball milling step, thereby reducing the density somewhat, and (3) tumbling the pulverized material until its density increases to the desired extent about 20 lbs. per cubic ft. More particularly the invention consists in a process for the densification of acetylene black, having a density less than 13 lbs. per cubic ft., to a powder of stable higher density which comprises the steps of (1) ball milling the acetylene black until its density is increased to a value above about 20 lbs. per cubic ft. with concomitant formation of flakes of densified material, (2) pulverizing the flakes of material which are formed by the ball milling step, thereby disintegrating the flakes and reducing the density of the material below about 20 lbs. per cubic ft., and (3) tumbling the pulverized material until its density has again increased to a value above about 20 lbs. per cubic ft.

The invention further includes, as a new product, an acetylene black of stable apparent density greater than 20 lbs. per cubic ft., formed by ball milling acetylene black until its apparent density has increased at least 50%, pulverizing the ball-milled material, thereby reducing its density somewhat, and tumbling the pulverized material until its density has increased to a value greater than 20 lbs. per cubic ft.

Inasmuch as the property of density of a powdery solid material can be defined and determined in a variety of ways, it is essential in considering densification to establish the definition of density that is being used. Obviously in the consideration of the density of a powdery material when the bulk volume is of concern, it is the "apparent" density, i.e., density of the bulk of the material including the voids therein, that must be measured. Hereinafter in this specification when the term "density" is used with regard to powdered materials it is to be construed as referring to apparent density. In order to make comparable measures, the apparent density must be measured under defined reproducible conditions in which extraneous voids, introduced into the bulk of the material in preparing it for the density measurement, are eliminated. In the following description therefore, the apparent densities which are referred to are those determined by a method such as is carried out wtih a "Numinco Tap-Pak Volumeter," made by Numec Instruments and Controls Corp. for measuring tap density and packing volume of powdered and granular materials. The specific procedure used in determining the apparent densities reported in this specification is as follows:

(1) A tared 250 ml. graduated cylinder is mounted on a rubber topped vertically reciprocating piston which is reciprocated 3/16 of an inch by a multiple cam wheel and return spring; 100 turns of the wheel having five cams thus provide 500 reciprocations or taps to the cylinder and its contents.

(2) About 200 cc. of acetylene black, free of large lumps, is placed loosely into the cylinder, and the wheel rotated 100 turns in approximately one minute.

(3) The volume of the acetylene black in the cylinder is then read and the cylinder weighed to ascertain the weight of the acetylene black.

(4) The apparent density of the acetylene black is calculated from the weight and volume thus determined.

Acetylene black as it is produced is a very light fluffy material which must be compressed for handling and shipping. Standard commercial material is compressed for shipping to a density of about 6¼ lbs. per cubic ft. and referred to as "50% compressed"; sometimes it is additionally compressed to a density of about 12½ lbs. per cubic ft. and referred to as "100% compressed" material. For some uses of acetylene black, densities of about 25 lbs. per cubic ft. are required, e.g. for mixing uniformly with tungsten metal powder in the production of tungsten carbide. It has been found that acetylene black can be ball milled to an increased apparent density, e.g. about 25 lbs. per cubic ft., but that the product so obtained is in the form of flakes which are unsuitable for homogeneous mixing with other powdered materials, such as tungsten powder for the production of tungsten carbide or manganese dioxide for the production of dry cell batteries. It has further been found that acetylene black in the form of flakes produced by ball milling does not retain its increased apparent density on pulverizing of the flakes; pulverizing of the flakes having an apparent density of about 25 lbs. per cubic ft. can reduce the apparent density of the material to about one-half this value, i.e. around 13 lbs. per cubic ft. Most surprisingly it has now been found that the acetylene black which has been ball milled to increase its density at least 50%, e.g. to 25 lbs. per cubic ft., and pulverized as above to break up or destroy the flakes, can be tumbled to raise its density, and an apparent density of above 20 lbs. per cubic ft., e.g. about 25 lbs. per cubic ft. again achieved. This observation is most unexpected in that the tumbling of acetylene black which has not been ball milled and pulverized as described above does not achieve any increase in density; it would appear that the ball milling step sufficiently alters the structure of the material to reduce its resiliency and permit a tumbling action to achieve an increase in the density. The material which has been thus densified is in the form of fine powder which can readily be homogeneously mixed with other powdered materials, e.g. tungsten metal powder.

Acetylene black is an extremely pure form of carbon. It is desirable therefore, when densifying the material, to preserve this high purity as well as possible. Hence, in the ball milling step of the present invention, it is preferred to use ball mills of steel and thus avoid the contamination introduced by mills made with stone or ceramic type parts. Most preferred are ball mills having a manganese steel lining and utilizing molybdenum steel balls.

The densified product obtained by ball milling acetylene black as described above is in the form of loose flakes. To convert these flakes to a powdery product of desired density it is necessary next to pulverize them, suitably in any of the commercial pulverizers available, for example the swing hammer type of pulverizer sold as a Raymond screen pulverizer. The pulverizing action converting the flakes to a powdery material is found also to reduce the density of the material.

To increase the density of the pulverized acetylene black obtained as above, it is adequate to tumble the material, e.g. in a simple tumbling barrel, preferably baffled to ensure adequate tumbling action. Although tumbling barrels are well known as a type of mixer, it is not generally known that they can serve adequately also to densify material being tumbled therein.

The invention may be more clearly understood from the following examples which are illustrative but not limiting of the scope thereof.

Example 1

50 lbs. of 100% compressed acetylene black having an apparent density of 12½ lbs. per cubic ft., was charged to a cylindrical ball mill having a chrome manganese steel shell two feet in diameter and three feet long and containing 900 lbs. of ¾ inch polished "Molly" molybdenum steel balls. The mill was rotated at a speed of 32 r.p.m. for five hours. At the end of this period the ball milled material was discharged and found to have an apparent density of 25.6 lbs. per cubic ft. and to contain much material in the form of flakes. To pulverize the flakes the ball milled material was hand brushed through a 100 mesh screen having 0.0058 mm. openings. The flakes were all pulverized thereby, and the screened material was found to be a lump and flake-free powder and to have expanded somewhat to an apparent density of 17 lbs. per cubic ft. A portion of this expanded material was then placed in a Patterson-Kelley "Twin-Shell" (V-shaped) blender and tumbled at 40 r.p.m. for two hours. The tumbled material was likewise lump and flake-free and had an increased apparent density of 24 lbs. per cubic ft.

Example 2

50 lbs. of 100% compressed acetylene black was charged to the same ball mill described in the preceding example, and similarly milled for five hours; the milled product had an apparent density of 23.5 lbs. per cubic ft. To pulverize the flaky material thus produced, a conventional laboratory size Raymond pulverizer was modified by removing its screen (thus increasing its rate of through-put while still achieving the desired pulverization) and by reducing its operating motor speed with a variable transformer to reduce its applied voltage from 110 to 60 volts. A sample of 25 lbs. of the flaky material was passed through this Raymond pulverizer and collected in a filter bag. The material was found to be free of flakes and to have expanded or "fluffed up" to an apparent density of 14.5 lbs. per cubic ft. To densify the expanded material again, a tumbling barrel was fashioned from a 2.5 ft. long by 2.5 ft. diameter ceramic lined ball mill by replacing the balls thereof with four steel blade baffles fastened inside the shell to cause tumbling of the contents as the shell rotated. The expanded material from the Raymond pulverizer was then tumbled in this tumbling barrel for five hours with samples of the tumbled material being taken periodically for determination of their density. From an initial value of 14.5 lbs. per cubic ft. the density of the tumbled acetylene black increased with time of tumbling as shown below:

| Hours of tumbling: | Apparent density (lbs. per cubic ft.) |
|---|---|
| 0 | 14.5 |
| 2 | 21.4 |
| 3 | 22.5 |
| 4 | 23.5 |
| 5 | 24.4 |

The densified material so obtained was capable of being blended homogeneously with tungsten metal powder for carburization thereof to tungsten carbide. Thus, from acetylene black having an apparent density of 12½ lbs. per cubic foot there was obtained acetylene black having a stable density of 24.4 lbs. per cubic ft.; achievement of this desideratum involved a temporary densification to 23.5 lbs. per cubic ft., expansion to 14.5 lbs. per cubic ft., and another densification to 24.4 lbs. per cubic ft.

Example 3

This example illustrates only the first step of the process of the invention, but demonstrates its applicability to 50% compressed acetylene black.

25 lbs. of 50% compressed acetylene black having an initial apparent density of 6¼ lbs. per cubic ft. was placed into a hard flint (Buhrstone) lined pebble mill about 28 inches in diameter and having a capacity of about 10 cubic ft. The mill was equipped with about two and one half cubic feet of flint pebbles averaging one inch in diameter, and was mounted to rotate at 30 r.p.m. The density of the acetylene black progressively increased as it was milled therein, and samples were taken periodically for measurement of their density. The densities achieved with accumulated milling times were as follows:

| Milling time (hours): | Density (lb./cu. ft.) |
|---|---|
| 2 | 7.90 |
| 3 | 14.11 |
| 4 | 20.08 |
| 5 | 22.14 |
| 6 | 24.15 |
| 7 | 24.29 |

Thus the apparent density of the material was increased approximately four-fold in about six hours; the material could then be pulverized and subsequently tumbled to achieve a stable apparent density of about 25 lbs. per cubic ft.

Numerous modifications can be made in the specific expedients hereinbefore described for carrying out the process of this invention without departing from the invention as defined in the appended claims. Thus for example the ball milling step can be carried out using ceramic lined ball mills and stone balls where the resulting slight contamination of the product by fine particles of ceramic and stone material is not objectionable. Likewise the flake material produced by the ball milling step can be disintegrated by various of pulverizing and types of pulverizers other than those described in detail in the examples. Finally, the various steps can be conducted under varying conditions such as speed of rotation of equipment, duration of the ball milling and tumbling periods, degree of attrition of the flakes in the pulverizing step, ambient or controlled temperatures, ambient or oxygen-free atmospheres, and with other modifications which are obvious to those skilled in the art. However, the sequence of steps as set out in the foregoing description is critical, and variation from the sequence does not produce the results achieved according to the process of the invention.

What is claimed is:

1. A process for the densification of acetylene black which comprises:

(1) ball milling the acetylene black until its apparent density has increased at least 50%, (2) pulverizing the flakes of material which are formed by the ball milling step, thereby reducing the density somewhat, and (3) tumbling the pulverized material until its apparent density increases to the desired extent above 20 lbs. per cubic ft.

2. A process as claimed in claim 1 in which the initial acetylene black has an apparent density of less than 13 lbs. per cubic ft., and is ball milled with concomitant formation of flakes of densified material until its apparent density is above 20 lbs. per cubic ft.

3. A process as claimed in claim 2, in which the ball milled material is pulverized with concomitant reduction of its apparent density to a value below 20 lbs. per cubic ft.

References Cited

UNITED STATES PATENTS

| 3,024,092 | 3/1962 | Gessler | 23—209.2 |
| 3,054,662 | 9/1962 | Gessler | 23—209.1 |
| 3,333,979 | 8/1967 | Milligan | 23—209.1 X |

FOREIGN PATENTS 676,344    12/1963    Canada.

OTHER REFERENCES

Dobbin et al.: "Ind. & Eng. Chem." vol. 38, No. 11, November 1946, pp. 1145–1148.

Mantell: "Industrial Carbon" 2nd ed., 1946, D. Van Norstrand Co., Inc., pp. 81–83.

EDWARD J. MEROS, *Primary Examiner.*

U.S. Cl. X.R.

23—208, 209.2, 293; 106—307